F. N. KRUCKOW.
MOTOR VEHICLE FENDER.
APPLICATION FILED DEC. 12, 1913.

1,099,058.

Patented June 2, 1914.

2 SHEETS—SHEET 1.

Witnesses
Frederick L. Fox.
U. B. Hillyard.

Inventor
F. N. Kruckow.
By Victor J. Evans.
Attorney

F. N. KRUCKOW.
MOTOR VEHICLE FENDER.
APPLICATION FILED DEC. 12, 1913.
1,099,058.
Patented June 2, 1914.
2 SHEETS—SHEET 2.
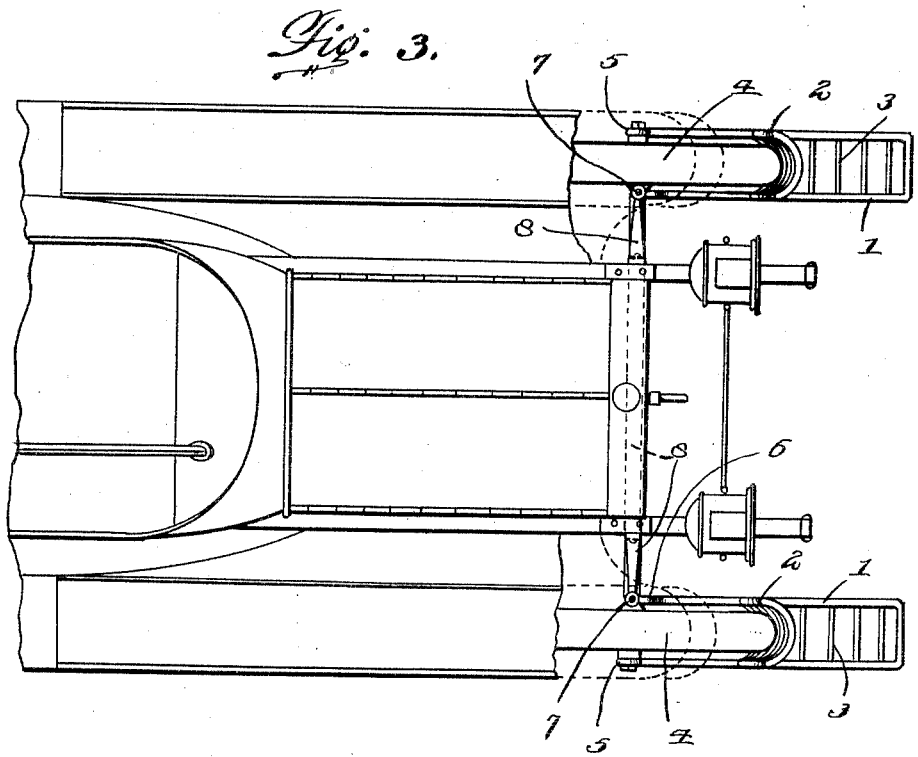
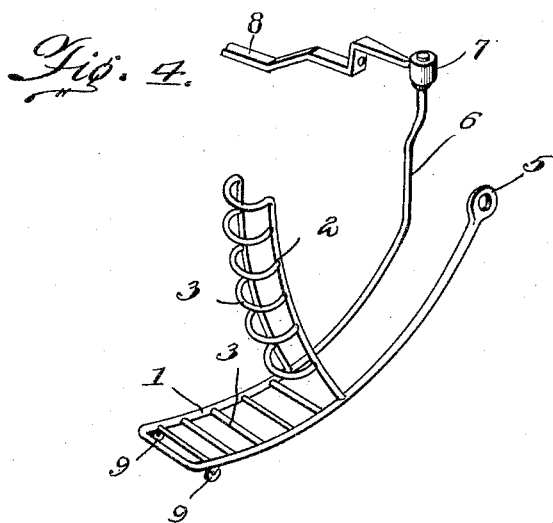
Witnesses
Frederick L. Fox,
U. B. Hillyard.
Inventor
F. N. Kruckow.
By Victor J. Evans.
Attorney

UNITED STATES PATENT OFFICE.

FRITZ NIELS KRUCKOW, OF DETROIT, MICHIGAN.

MOTOR-VEHICLE FENDER.

1,099,058.  Specification of Letters Patent.  Patented June 2, 1914.

Application filed December 12, 1913.  Serial No. 806,271.

*To all whom it may concern:*

Be it known that I, FRITZ NIELS KRUCKOW, a citizen of the United States, residing at Detroit, in the county of Wayne and State of Michigan, have invented new and useful Improvements in Motor-Vehicle Fenders, of which the following is a specification.

The invention provides safety means particularly designed for automobiles, motor trucks and the like to prevent the wheels thereof from passing over a pedestrian in the path of the vehicle and struck by the same.

The invention provides a fender, the same embodying like parts, each of which is applied to one of the front wheels of the machine in such a manner as to turn therewith and which is braced from a convenient part of the frame to hold the parts in position to engage a person and prevent the wheel or wheels of the machine from passing over the person who may be struck.

The invention consists of the novel features, details of construction and combination of parts, which hereinafter will be more particularly set forth, illustrated in the accompanying drawing, and pointed out in the appended claims.

Figure 1:
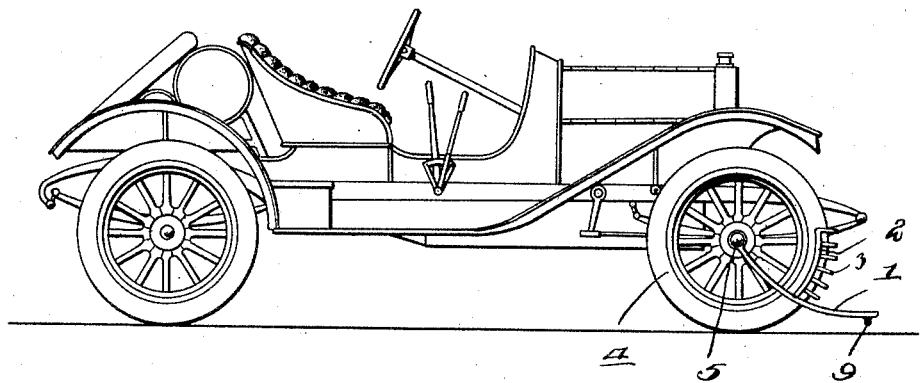
Figure 2:
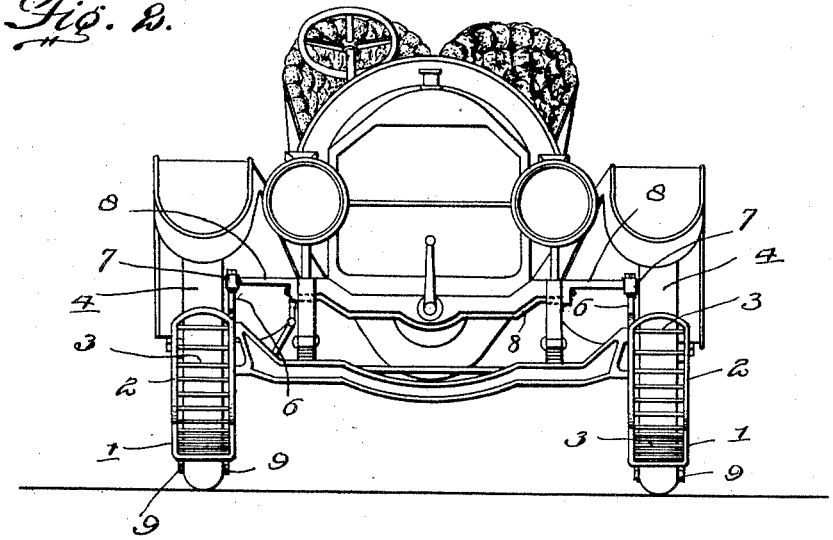

Referring to the drawing, forming a part of the specification, Figure 1 is a side view of an automobile provided with a fender embodying the invention. Fig. 2 is a front view. Fig. 3 is a top plan view. Fig. 4 is a detail perspective view of the fender.

Corresponding and like parts are referred to in the following description and indicated in all the views of the drawing by the same reference characters.

The fender comprises like parts, each of the front wheels of the fender or machine of the vehicle being provided with one of such parts, the latter embodying a forwardly extending member, such upwardly extending member constituting a guard to prevent the person picked up by the forwardly extending member from coming in contact with the wheel. Each part of the fender is of like formation, hence, a detailed description of one only will be given. The fender comprises a forwardly extending member 1, and an upwardly extending member 2, said members being connected in any substantial way and each of such members comprising a frame which has its longitudinal members connected by means of cross pieces 3, which may be pins or rods of any gage. The member 1 curves throughout its length and comprises a frame, the side pieces of which extend along opposite sides of the wheel 4, the outer side pieces terminating in an eye 5 which receives the outer end of the wheel spindle and the inner side piece extending upward and forming a standard 6, which is in a vertical line with the pivot about which the spindle or axle arm turns. The upper end of the standard 6 is mounted in a bearing 7 which is secured to the machine or frame thereof in any suitable manner. As indicated, a transverse rod or bar 8 is rigidly secured to the machine and its end portions receive and support the bearings 7 in which the upper ends of the standards 6 are mounted to move. The member 2 is located in front of the wheel and consists of a frame whose side members are connected by cross pieces. The members 1 and 2 are in the plane of the wheel and turn therewith. One or more rollers 9 are provided upon the under side of the member 1 and prevent injurious contact of said member with the surface over which the machine may be traveling.

It will be understood from the foregoing, taken in connection with the accompanying drawings that the invention provides a fender, which is efficient, comparatively light, strong and capable of being readily fitted to any make of machine and which does not detract from the appearance of such machine or prevent access being readily had to any part for repairs or for other purposes such as cleaning, oiling and the like.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having described the invention, what is claimed as new, is:

1. In a motor vehicle embodying steering wheels and knuckles, a fender for each of such steering wheels, the same embodying members extending along opposite sides of the wheel and in front thereof, the outer member being attached to the wheel spindle and the inner member extending upward to form a standard in line with the pivot of the steering knuckle, a bearing supported by the frame of the machine and having the said standard journaled therein, and cross pieces connecting the parts of the members projecting in front of the steering wheel.

2. In a motor vehicle embodying steering wheels and knuckles, a fender for each of such steering wheels, the same embodying members extending along opposite sides of the wheel and in front thereof, the outer member being attached to the wheel spindle and the inner member extending upward to form a standard in line with the pivot of the steering knuckle, a bearing supported by the frame of the machine and having the said standard journaled therein, cross pieces connecting the parts of the members projecting in front of the steering wheel, other members projecting upwardly from the first mentioned members along the sides of the rim portion of the wheel and cross pieces connecting such upwardly extending members and extending across the tread portion of the wheel.

3. In a motor vehicle embodying steering wheels and knuckles, a fender for each of such steering wheels, the same embodying members extending along opposite sides of the wheel, one of such members engaging the steering knuckle and the other member extending upwardly to form a standard in line with the pivot about which the steering knuckle turns and a bearing supported by the frame of the machine and to which the upper end of such standard is pivoted.

In testimony whereof I affix my signature in presence of two witnesses.

FRITZ NIELS KRUCKOW.

Witnesses:
CHARLES E. LEE,
WALTER A. THAYER.

---

Copies of this patent may be obtained for five cents each, by addressing the "Commissioner of Patents, Washington, D. C."